United States Patent Office 3,468,584
Patented Sept. 23, 1969

3,468,584
WHEEL AND BRAKE CONSTRUCTION
Keith W. Tantlinger, Grosse Pointe Shores, Mich., assignor to Fruehauf Corporation, a corporation of Michigan
Filed Feb. 14, 1967, Ser. No. 616,011
Int. Cl. B60b 1/00, 27/00
U.S. Cl. 301—6                    9 Claims

ABSTRACT OF THE DISCLOSURE

The dual wheel has an extruded hub from which extruded spokes extend for supporting a brake drum and removable wheel rims.

---

The present invention has an object of providing a wheel made up of extruded spokes and an extruded hub separately or as a unit to which the wheel rims and brake drum or disk are secured by studs which secure the wheel rims.

It is a further object of the invention to extrude a hub having a hollow interior and axially disposed slots on the outer surface in which one end of the extruded spokes are welded in radial relation to the hub.

It is a further object of the invention to extrude a continuous web having a slotted opening in a head along one edge from which feet extend for supporting the wheel rims when the webs are used as wheel spokes.

It is a still further object of the invention to support the brake drum or disk within one of the wheel rims on the supporting studs so as to apply the braking force directly to the rims.

It is a further object of the invention to employ a flanged locking ring which secures both wheel rims on the spokes of a dual wheel which permits the removal of the rims from the outer side of the wheel.

And in general to provide a wheel of light weight and sturdy construction from an extruded hub and a plurality of spokes which is simple in construction, which relieves the spokes and hub of the braking force and which is economical of manufacture.

Other objects and features of novelty of the invention will be specifically pointed out or will become apparent when referring, for a better understanding of the invention, to the following description taken in conjunction with the accompanying drawings, wherein.

Figure 1:
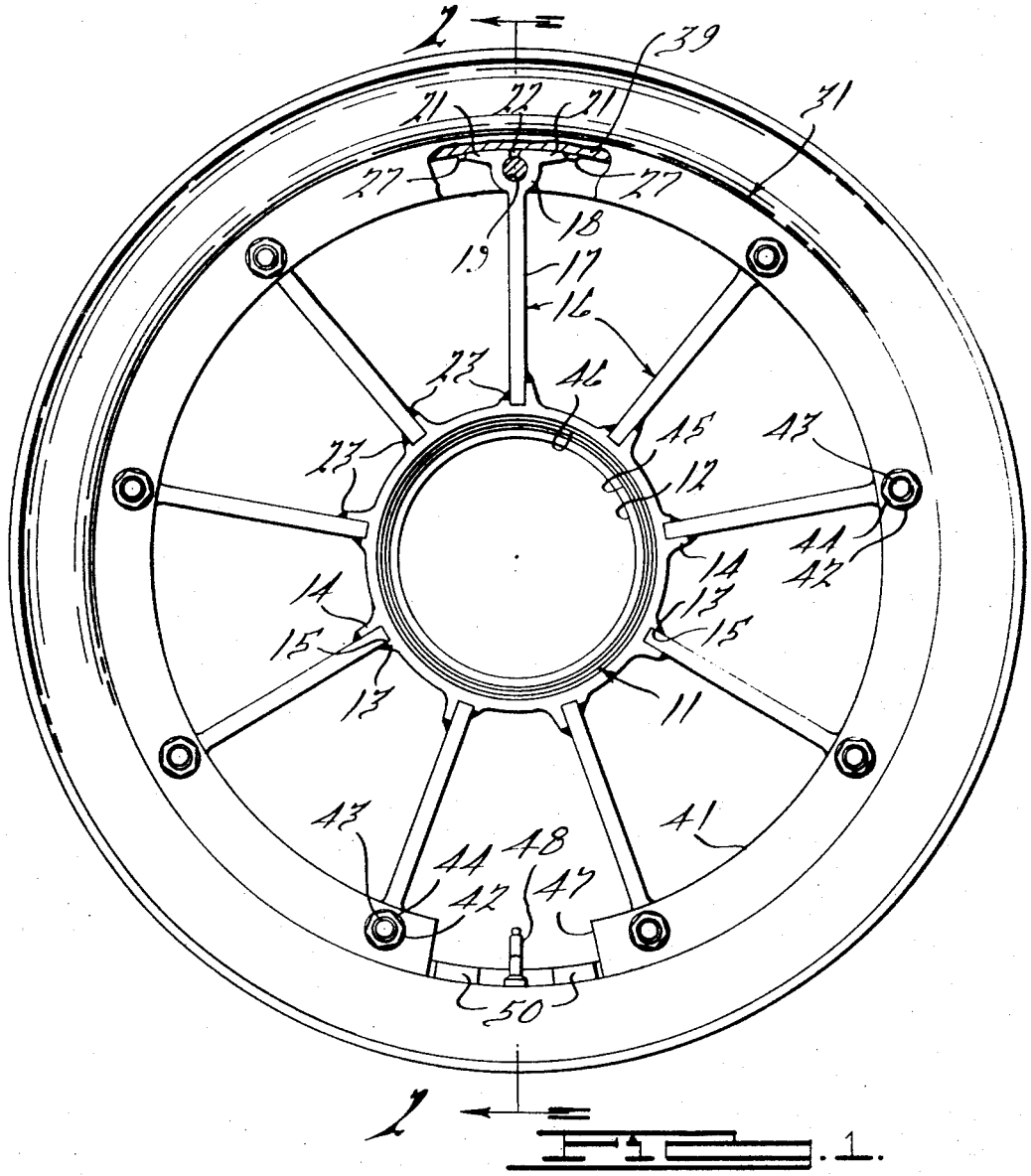
FIG. 1 is a view in elevation of a wheel having a part broken away.
Figure 2:
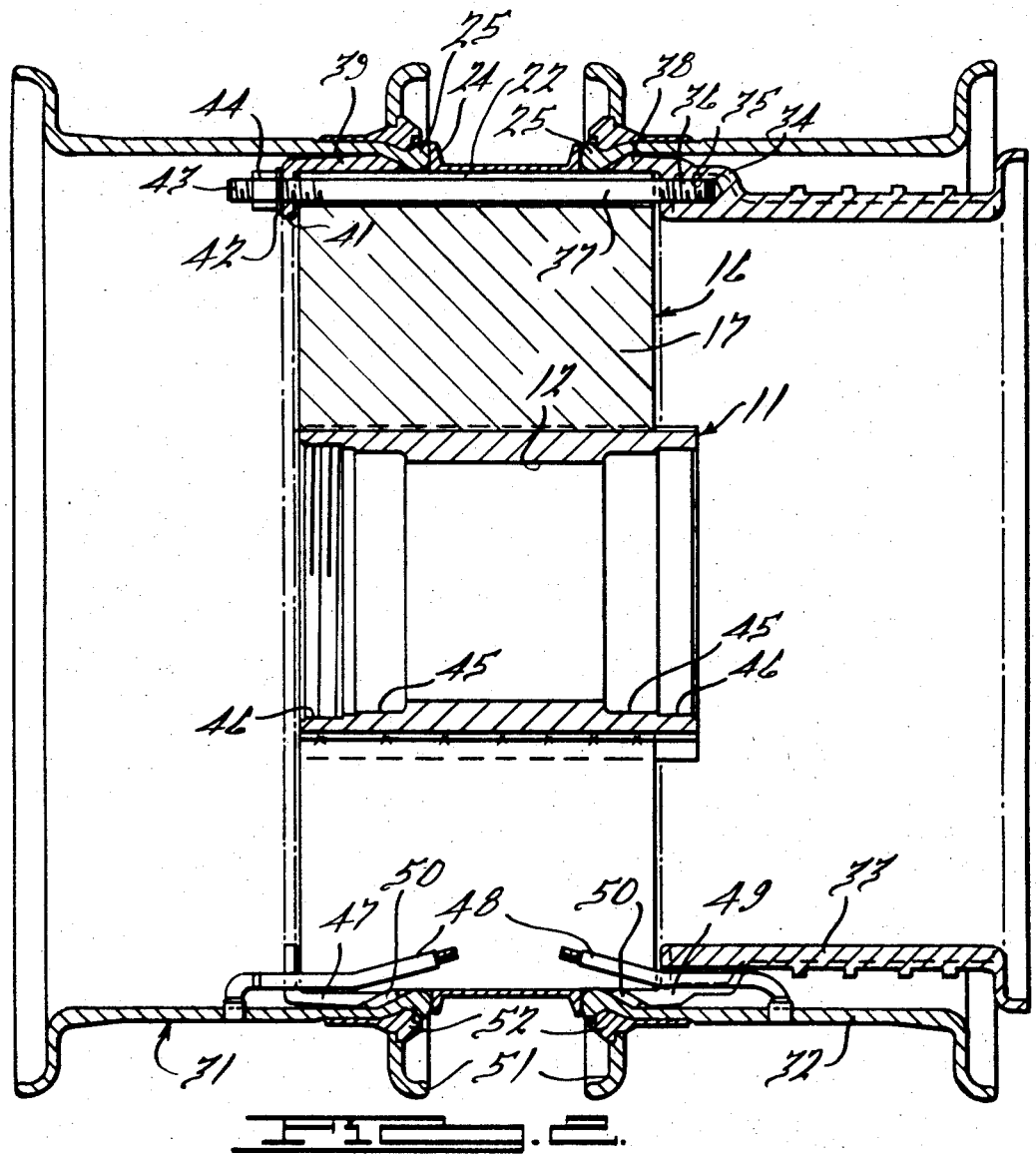
FIG. 2 is a sectional view of the structure illustrated in FIG. 1, taken on the line 2—2 thereof.

Referring to FIGS. 1 and 2, the wheel hub 11 is extruded to have a central aperture 12 and pairs of projecting legs 13 and 14 on the outer periphery forming slots 15 which are axially disposed. A plurality of spokes 16 are also extruded preferably in a continuous strip which are cut to desired length. Each spoke has a rectangular section 17 with a head 18 on one edge provided with an aperture 19 and extending feet 21 which are spaced by a slot 22 which communicates with the aperture 19. The opposite end of the rectangular portion 17 of each spoke extends within a slot 15 and is secured therein as by welds 23. A flanged spacer band 24 has spaced inner flanges 25 which engage the outer ends of the feet 21 of a spoke when moved into position thereover to retain the band against rotation on the feet.

Wheel rims 31 and 32 are of conventional construction and are spaced by the spacing band 24 when secured together on the spokes 16 in a manner to be removable from the outer end of the wheel. A brake drum 33 is provided with an enlarged inner end 34 which contains a plurality of threaded apertures 36 which are in alignment with the apertures 19 at the outer end of the spokes 16. One of a plurality of studs 37 having a thread on each end is passed through each aperture 19 and is screwed in the threaded apertures 36 of the brake drum. The brake drum has a locking ring 38 extending over the ends of the spokes in engagement with an annular boss 26 on the rim 32. A similar annular boss 26 on the rim 31 is locked in position by an annular flange 39 on a ring flange 41 containing apertures aligned with the studs 37 to which it is secured by the nuts 44 and lock washers 42 on the outer thread 43 of the studs 37. Upon removing the nuts 44 and lock washers 42, the ring flange 41 with the annular flange 39 can be withdrawn along with the wheel rim 31 and when desired, the spacing band 24 and the wheel rim 32 may also be withdrawn. By locating the drum 33 and supporting it on the feet 21 of the spokes 16 by the studs 37, the braking force produced on the drum is applied directly to the feet and the wheel rims 31 and 32, thereby relieving the spokes and hub of the majority of the braking force.

It will be noted in FIG. 1 that the flange 14 is substantially longer than flange 15 on the exterior of the hub 12. The longer flange 14 reinforces the spokes at the junction with the hub in the direction in which the stopping force is applied to the spokes during a braking operation occurring directly to the rims of the wheels. It will be noted that the internal aperture 12 in the hub is enlarged at 45 and 46 to receive the bearings and seals along with a sealing cap employed when mounting the wheel on an axle. The flanges 41 and 39 of the locking ring have a spaced end forming a slot 47 through which the stem 48 in the rim 31 passes. The locking flange 38 on the boss 34 of the hub likewise has a wide slot 49 therein through which the stem 48 may pass. The rims 31 and 32 have a pair of bosses 50 thereon which extend within the slots 47 and 49 and prevent the rim from rotating relative thereto. A tire-engaging ring 51 is removable from the main portion of the rim 32 when a split locking ring 52 is removed therefrom. After a tire is placed on the rims 31 and 32 the rings 51 are applied thereto and retained thereon by the split locking rings 52.

Figure 3:
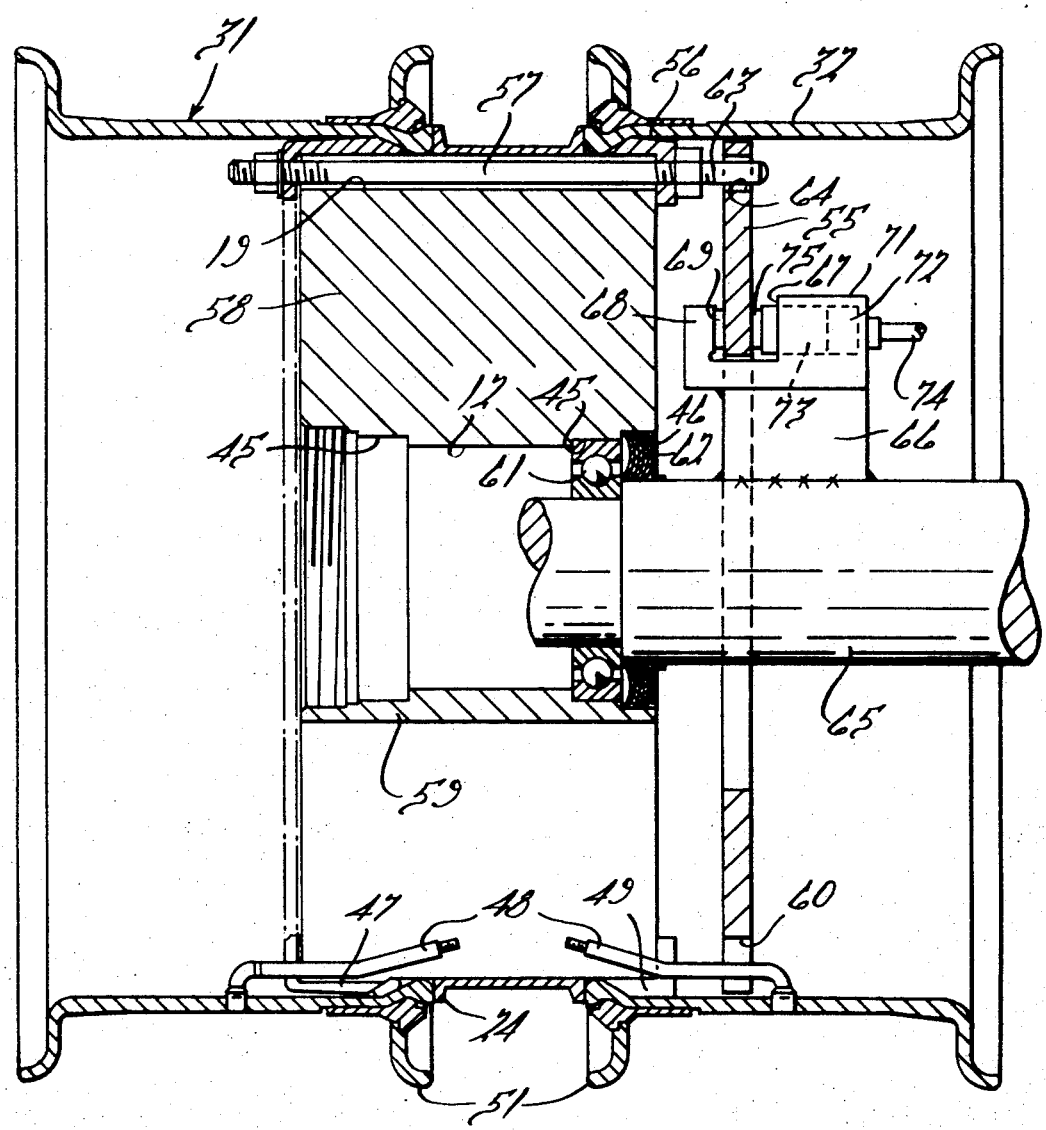
FIG. 3 is a view of structure similar to that illustrated in FIG. 2, showing another form of the invention.

Referring to FIG. 3, a further form of the invention is illustrated that wherein a brake disk 55 is employed in place of the brake drum 33 of FIG. 2. In this arrangement the rims 31 and 32 are the same as those in FIG. 2 with the exception that an inner locking ring 56 is employed on the inner ends of studs 57 which are mounted in apertures 19 at the end of each spoke 58. The spokes 58 are in unit relationship with the central hub 59, the hub and spokes being extruded as a unit to have the same form as the hub 11 with the spokes 16 thereon. The inner aperture 12 of the hub is machined in the same manner as the hub 11 to have bearing recesses 45 for bearings 61 and a recess 46 for a seal 62. Otherwise, the structure is the same as that illustrated in FIG. 2.

The studs 57 have an extending end 63 on the inner side with which apertures 64 of the brake disk 55 are aligned and on which the disk is supported for movement longitudinally of the studs. The static axle 65 of the trailer has a housing 66 fixed thereto as by welding or the like, the housing having a slot 67 at the top which receives the disk 55. The extension 68 at one side of the slot supports a brake pad 69, the extension 71 at the opposite side of the slot contains a cylinder 72 and a piston 73, which is movable toward and from the disk by fluid from a conduit 74. The extending face of the piston 73 has a brake pad 75 thereon of the size and shape of the pad 69 on the extension 68.

When pressure is applied to the cylinder 76, the pads relatively move toward each other and center the disk 55 relative thereto so that like pressures will be applied on opposite sides of the disk by the pads 69 and 75. The braking pressure is applied to the studs 57 in the same manner as that of the brake drum 33, relieving the hub and spokes from the brake pressure which is directly applied from the disk and studs to the rims 31 and 32. In either construction the wheel is applied to the end of the axle in the usual manner and the brake drum and disk brake are so mounted as to apply the braking force directly to the rims and tires. It will be noted that a slot 60 is provided in the brake disk 55 to permit the rim air tube 48 to pass therethrough.

The main advantages derived from the use of the extruded spokes and hub made from aluminum is a reduction in weight, in accumulated heat and in cost. By using the spacing band 24, the rims will be accurately located, provide accurate tracking of the tires, longer tire and bearing life and less power consumption. With this arrangement the brakes will run much cooler resulting in less brake fade and longer lining life. A substantial advantage results from having the brake drum or disk supported on the studs at the outer ends of the spokes as the braking force will occur directly from the drum or disk to the wheel rims thereby relieving the hub and spokes of the direct braking forces. Since the rims are locked upon the wheel by a continuous flange rather than spaced lugs, less rim distortion will result.

What is claimed is:

1. In a wheel, said wheel including a central extruded hub having a hollow interior with bearing recesses in the ends and with a plurality of exterior axially disposed slots formed by axially extending pairs of spaced flanges, said spokes having a width substantially the length of said slots in which the inner ends are disposed between said pair of spaced flanges and secured in fixed relation thereto, said spokes being of the same length to have the outer ends fall within a cylindrical surface and including means for receiving and supporting a wheel rim.

2. In a wheel as recited in claim 1, wherein one flange of each slot is longer than the other.

3. In a wheel as recited in claim 1, wherein the outer edge of said spokes have feet thereon containing a slotted central aperture extending the length thereof for supporting securing studs.

4. In a wheel as recited in claim 3, wherein a brake drum is secured to the studs and is provided with an annular locking flange for a wheel rim which extends over the drum.

5. In a wheel as recited in claim 4, wherein the locking flange has a space therein for the air admission tube on the inner portion of the rim which has boss means thereon extending into said space to prevent the rim from rotating on the spokes.

6. In a wheel as recited in claim 3, wherein a spacing band is secured on the feet and provided with inner projecting means engageable with one of the feet to prevent the band from rotating thereon.

7. In a wheel as recited in claim 6, wherein said locking means embodies a locking ring having a face flange containing apertures which receive the outer end of the threaded studs, and nuts on said threaded ends for retaining the locking ring in clamped position.

8. In a wheel as recited in claim 7, wherein the locking ring has spaced ends through which the air tube on the rim passes when the rim is placed on the feet.

9. In a wheel as recited in claim 8, wherein projecting means are provided on the rims which extends within the space and spaced ends of the locking flanges for preventing the rims from rotating on the feet.

References Cited

UNITED STATES PATENTS

| 3,231,477 | 1/1966 | Saunders. |
| 1,851,187 | 3/1932 | Keller. |
| 1,894,251 | 1/1933 | Woodward. |
| 1,952,075 | 3/1934 | Keller. |
| 2,450,507 | 10/1948 | Flogaus. |
| 2,773,552 | 12/1956 | Schjolin _____ 301—6 X |

OTHER REFERENCES

Fischer: German printed app. 1,112,699, August 1961.

RICHARD J. JOHNSON, Primary Examiner

U.S. Cl. X.R.

301—13, 105